Jan. 2, 1968  J. M. MATSEN  3,361,838
CONTINUOUS CHROMATOGRAPHIC CATALYTIC REACTION
AND SEPARATION OF PRODUCTS
Filed Oct. 4, 1965

JOHN M. MATSEN  INVENTOR

BY  Frank A. Dinwock

PATENT ATTORNEY

United States Patent Office 3,361,838
Patented Jan. 2, 1968

3,361,838
CONTINUOUS CHROMATOGRAPHIC CATALYTIC REACTION AND SEPARATION OF PRODUCTS
John M. Matsen, Roselle, N.J., assignor to Esso Research and Engineering Company, a corporation of Delaware
Filed Oct. 4, 1965, Ser. No. 492,796
11 Claims. (Cl. 260—668)

This invention relates to an improved method for carrying out a catalytic conversion process, and more particularly, to an improved method for continuously reacting a fluent feed and separating the products thereof to maximize product yield in chromatographic reactions.

In conducting catalytic liquid or vapor phase conversion processes, the chemical equilibrium established during the course of the reaction often acts to limit the efficiency of the reaction. In processes where the chemical equilibrium constant is low, only small amounts of product will be formed before the reaction effectively ceases. Of course, the reaction does not stop, but the rate of forward reaction (to form products) is equal to the rate of the reverse reaction (products recombining) and the ratio of products to reactants remains fixed. Consequently, large amounts of feed material are required to produce appreciable quantities of product. However, the product must then be separated from the reaction mixture which contains the excess feed material and this may be costly and troublesome.

More severe conditions such as are produced by changes in temperature and pressure may also increase product formation. However, this method is limited again by the chemical equilibrium and has the further disadvantages of requiring high temperature and/or high pressure equipment. Furthermore, higher temperatures may result in undesirable side reactions or hydrocracking of some hydrocarbon feeds.

Equilibrium reactors have been developed to increase product yield in low equilibrium reactions. However, these have not proved wholly successful because of the length of time involved in the reaction and the small increase in conversion.

It is known that separation of one or more products from the reaction mixture will upset the chemical equilibrium and allow more product formation. Several methods for separating the products from the reaction mixture have been developed; however, none have been particularly successful. The most recent of these methods and the problems encountered therein are described in U.S. Patent No. 2,976,132 to Dinwiddie and Morgan. This method involves a periodic feeding system wherein the catalytic conversion is carried out in a fixed catalyst bed and the products are separated by their different rates of travel through the bed, the moving force being a carrier gas continuously flowing through the bed. The problems arise in controlling the feed rate, collecting and separating the products. The present invention seeks to overcome these problems. It will be seen from the following description how this is accomplished.

One object of this invention, therefore, is to provide a continuous catalytic reactor whereby the products of the reaction may be continuously separated from the reaction mixture.

This and other objects will become apparent from the following description.

In accordance with this invention a fluent feed stock is continuously fed to a chromatographic conversion zone wherein a moving bed of adsorbent catalyst is unidirectionally flowed, e.g., downwardly; and wherein a fluent carrier flows countercurrent to the adsorbent catalyst stream, e.g., upwardly. The feed is catalytically converted to its products, at least one product being selectively adsorbed by the moving bed of adsorbent catalyst, i.e., one product is more strongly adsorbed than another. With proper adjustment of catalyst and carrier flow rates, the more strongly adsorbed product will leave the bottom of the conversion zone adsorbed on the catalyst, while the less strongly adsorbed products will leave in the fluent carrier stream at the top of the conversion zone. Thus, the reaction products are continuously being separated from the reaction mixture, forcing the reaction to substantial completion. One result of this invention, therefore, is to substantially increase the product yield of a low equilibrium reaction. Another result is to substantially reduce the conversion temperatures for reactions to which this invention is applicable.

The operation of this invention will be more easily understood by referring to the attached drawings.

Figure 1:
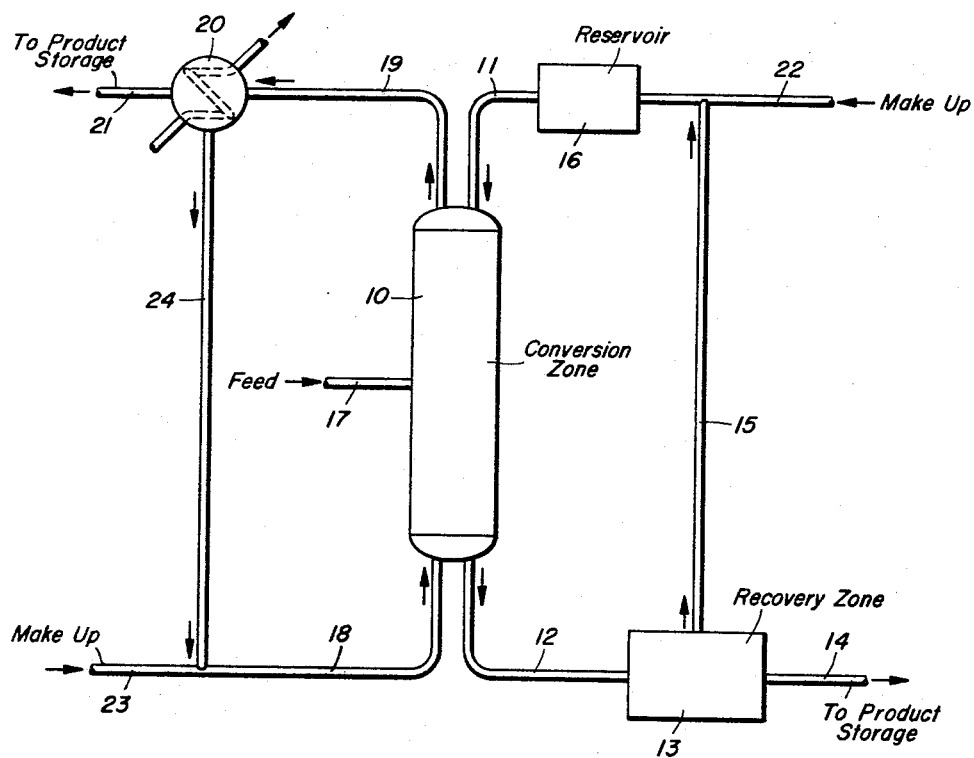
FIGURE 1 shows a schematic flow plan of the invention process.
Figure 2:
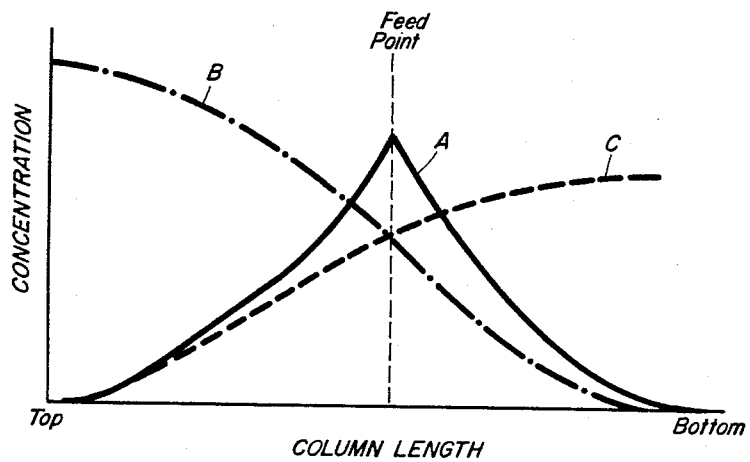
FIGURE 2 shows a graphic representation of the type of product conversion and separation that may be achieved with this process.

For purposes of illustration only and with reference to FIGURES 1 and 2, consider the reaction $A \rightleftharpoons B + C$. Assume that C is the more strongly adsorbent product.

Turning now to FIGURE 1, the moving bed of adsorbent catalyst is introduced through line 11 to the chromatographic conversion zone 10, which is maintained at a suitable temperature. (The rate of flow of the adsorbent catalyst stream and all other streams is suitably controlled by meters, pumps, etc., which are not shown in the schematic drawing. Also, heating or cooling equipment and lines are not shown for reasons of simplicity). The fluent carrier, for this illustration assumed to be a gas, is introduced through line 18 and flows countercurrent to the catalyst stream. Reactant A is continuously fed to conversion zone 10 by line 17. The flow rates of reactant A, catalyst stream, and carrier gas are suitably adjusted for the particular catalytic conversion to take place.

The catalytic conversion is effected as reactant A contacts the catalyst. Of the products formed, the more strongly adsorbed product, C, will leave the conversion zone 10 through line 12 to product recovery area 13. Product C can be recovered by heating the adsorbent catalyst and driving out the product, by lowering the total pressure of the system, etc. The product is sent by line 14 to a storage facility while the adsorbent catalyst is recycled by way of line 15. The catalyst stream joins any make-up catalyst that may be necessary, from line 22, and enters reservoir 16 to await feeding to the reaction zone.

The less strongly adsorbed product B will be carried through the reaction zone by the carrier gas and out through line 19. Separation of carrier gas and product will take place in condenser 20, from whence the product will proceed by line 21 to storage and the carrier gas will be recycled by way of line 24. Make-up carrier gas from line 23 will be added as necessary.

Unconverted reactant will leave the column with carrier, by line 19 or with the catalyst by line 12, depending upon the flow rates of reactant, catalyst stream and carrier stream. Separation techniques will depend on the conversion effected and purity of product desired.

The feed, line 17, may be introduced at any suitable point in the conversion column. The determining factors will be the reaction rate and the rate of separation of product. The conversion column must be long enough to effect the maximum optimum conversion. However, the mid-point of the conversion column is the preferred feed point.

Turning now to FIGURE 2, there is shown a graphical representation of concentration of reactant A and products B and C at any point in a theoretical reaction unit. It should be noted that under steady state conditions the reactant A is at peak concentration at the feed point and is then distributed throughout the column in diminishing amounts. It can be seen that at any point in the column the equilibrium mixture favors the formation of the products, B and C. At the top the column will be rich in B, the less strongly adsorbed material, and lean in C, the more strongly adsorbed material. At the bottom of the column the reverse will be true. As reactant A approaches either end of the column, there will be an absence of one of the products, thus upsetting the chemical equilibrium and forcing the reaction "to the right" and further conversion.

By properly adjusting flow rates for a known reaction rate, the amount of reactant A, either carried out by the fluent carrier or unreacted on the catalyst, will be very small.

The fluent carrier employed in this invention may be a liquid or gaseous medium. The carrier may be inert with respect to the catalytic conversion, it may react with the feed stock, or it may act as a catalyst regenerative, in addition to its function as a carrier fluid. For example, ammonia may be used as a carrier in ammonolysis reactions, water or steam may be used in hydrolysis reactions, etc. The fluent carrier constitutes the fluent reaction medium and hence should be in the proper phase. That is, for liquid phase reactions the carrier should be liquefied, and for vapor phase reactions the carrier should be gaseous. In vapor phase reactions, however, a liquid feed may be vaporized in the conversion zone, i.e., the dehydrogenation of cyclohexane to benzene.

In vapor phase reactions, substantially inert gases such as nitrogen, helium, argon and the like, may be employed. Gaseous mediums such as steam, flue gas, carbon dioxide, carbon monoxide, and even oxygen, hydrogen, hydrogen sulfide, gaseous hydrocarbons, and the like, may also be used when they are inert under reaction conditions or when they are a desired reactant for multiple reactant conversions.

In liquid phase reactions, liquid or liquefied carriers such as benzene, water, liquefied butane, alcohols, ethers, etc., may be employed.

The adsorbent catalyst used in this invention is both catalytically active and has a large surface area for adsorbing one of the products of the reaction. It is employed in a finely divided condition and preferably supported on a high surface area, preferably microporous carrier such as activated alumina. The state of subdivision of the catalyst particles and the porosity thereof may be varied within wide limits, depending upon the nature of the catalytic conversion to be carried out. However, it is generally preferable to use a finely divided catalyst with a particle size within the range of about 3 to about 60 mesh (.25 inch to .01 inch).

The adsorbent catalyst will depend on the particular catalytic conversion to take place. For example, dehydrogenation of olefinic, aliphatic, and naphthenic hydrocarbons may be effected with improved results in the presence of a finely divided dehydrogenation catalyst such as chromia, molybdena, or platinum supported on a high surface area carrier, e.g., alumina or an essentially $Fe_2O_3$ catalyst comprising 70 to 80 percent $Fe_2O_3$, 3 percent $Cr_2O_3$, and 17 to 29 percent $K_2CO_3$. Similarly, combined isomerization-dehydrogenation reaction may be carried out in the presence of materials that catalyze this reaction, such as finely divided platinum or palladium supported on alumina, said catalyst also serving as a hydrogen adsorbent.

In carrying out this invention it is not necessary that the catalyst used to promote the reaction also be the adsorbent. In many instances this requirement would overburden the necessary properties of a catalytic material. In such an instance, an adsorbent, in finely divided condition, may be introduced to the reaction zone in an intimate mixture with the catalyst stream. Recovery of the adsorbed product may be in the same manner as previously described. The separate adsorbent may serve either as an aid in the adsorption of a product or as the sole adsorbent. In the former case the catalyst and adsorbent will adsorb product; in the latter case only the adsorbent will adsorb product, the catalyst being used only as a catalytic agent. An example of a reaction in which a separate adsorbent may be used is the Deacon process:

$$2HCl + \tfrac{1}{2}O_2 \rightleftharpoons Cl_2 + H_2O$$

This reaction reaches equilibrium in the presence of a copper chloride catalyst. Carrying out this reaction in accordance with this invention could increase the product yield. The feed material, hydrogen chloride, is introduced to a conversion zone wherein a stream of oxygen flows countercurrent to the catalyst stream. The catalyst stream consists of the copper chloride catalyst and an adsorbent for water, such as an acid resistant molecular sieve. This arrangement permits continuous separation of water from chlorine, thereby allowing the reaction to proceed to completion.

Adsorbents for use in conjunction with catalysts may be chosen from the many known to the art. However, the choice of adsorbent will depend upon the reactants, reaction conditions, and desired adsorbent. The adsorbent should be in the same size range as the catalyst and intimately mixed with the catalyst before entering the reaction zone. Adsorbents that may be used are silica, molecular sieves, activated carbon and the like. Of course, the adsorbent should not interfere with the reaction taking place. The possibilities and variations that this invention allows will be obvious to those skilled in the art and the foregoing versions are not intended to limit the invention in any way.

Temperatures and pressures in the reaction zone will vary with the particular catalytic conversion being effected. In general, the reaction conditions may be similar to reaction conditions that would exist in any other type of reactor. However, milder conditions may also be used when they would be advantageous. For example, in the dehydrogenation of cyclohexane to benzene, the catalytic reactor of this invention operating at about 190° C. will theoretically yield the same conversion as a conventional reactor operating at about 310° C. However, conducting the reaction at 310° C. produces undesirable side reactions which would greatly hamper the efficiency of the process.

In general, the continuous type reactor described above is most efficient when:

(1) The chemical equilibrium constant for the reaction is small;

(2) The reaction rate is high enough so that separation of products rather than reaction rate limits the extent of the reaction;

(3) A least two products are formed which can be separated by adsorption in the conversion zone;

(4) The reactants are not separated in the conversion zone. This is most easily accomplished with only one reactant. However, as mentioned above, the fluent carrier may be a reactant or two reactants may be introduced to the conversion zone. Where neither reactant serves as the fluent carrier, their strengths of adsorption should not vary greatly from each other, if the reaction is to proceed to efficient completion.

Examples of processes that may be advantageously carried out in accordance with the present invention are dehydrogenation of propane to propylene, dehydrogenation of butane to butene, dehydrogenatin of cyclohexane to benzene, dehydrogenation of butene to butadiene, the combined isomerization and dehydrogenation of pentane to isopentene to isoprene, the combined dehydrogenation and condensation of propane or propane-butane mixtures to form $C_6$ to $C_8$ hydrocarbons predominantly, etc. Conventional conversion processes of the type mentioned above are described in greater detail in the art, such as "The Chemistry of Petroleum Hydrocarbons," vol. 2, published by Reinhold, 1955, wherein conversion conditions and catalysts for processes of the type contemplated by the present invention are described in greater detail.

The following examples are illustrative only and are not meant to limit the scope of this invention in any way.

EXAMPLE 1

In the dehydrogenation of cyclohexane to form benzene, a bench scale reactor consisting of a vertical glass column, 0.6 inch inner diameter, with a 20-inch reaction zone was used. The catalyst was 0.6 percent platinum on eta alumina and had a surface area (BET) of about 180 meters$^2$/gram. Catalyst grains of 20 to 40 mesh were fed from a reservoir at the top of the column and their flow rate controlled by passage through an orifice at the bottom of the column. Liquid cyclohexane was continuously fed to the mid-point of the column with a motor-driven syringe at the rate of 0.7 cc. during the 5-minute run. The carrier gas used was helium and flowed at a rate of 10 cc./min. The products leaving on the catalyst from the bottom of the column were pumped off under vacuum at the end of the run. In each run 290 grams of catalyst were used. The temperature was maintained by a heating tape at 190° C. Duration of the run was 5.0 minutes. The product from the bottom of the column was 100% benzene.

EXAMPLES 2–7

The same procedure was used as in Example 1, except as noted; Table I shows the results.

TABLE I

| Ex. | Duration of Run, min. | Amount of Reactant, cc. | Temp., ° C. | Carrier Gas Flow, cc./min. | Percent Conversion [1] | Percent Increase in Conversion [2] |
|---|---|---|---|---|---|---|
| 2 | 4.5 | 0.7 | 190 | 10 | 97 | 1,840 |
| 3 | 4.0 | 0.6 | 190 | 10 | 93 | 1,770 |
| 4 | 4.0 | 0.5 | 195 | 10 | 80 | 1,500 |
| 5 | 4.0 | 0.5 | 195 | 9 | 86 | 1,620 |
| 6 | 4.0 | 0.6 | 200 | 6 | 93 | 1,770 |
| 7 | 4.0 | 0.5 | 200 | 7 | 90 | 1,700 |

[1] Based on cyclohexane feed.
[2] At these temperatures the equilibrium constant is about $1.7\times10^{-4}$ and the equilibrium conversion would be only about 5 percent.

For this particular reaction the equilibrium constant increases with temperature so that the theoretical equilibrium conversion will become favorable at a sufficiently high temperature. In a conventional reactor of 1 atmosphere pressure, an equilibrium constant of 7.75 is required to obtain 95% conversion of cyclohexane to benzene. The constant will reach this value at about 310° C. However, use of high temperature increases the rate of coke formation and consequent catalyst deactivation and also increases side reactions, so that in actual practice the desired conversion would be difficult to obtain, if at all.

EXAMPLE 8

In equipment as used in Example 1 and employing the same experimental procedure, except that the catalyst consists of 3 wt. percent $Cr_2O_3$, 26 wt. percent $K_2CO_3$, and 71 wt. percent $Fe_2O_3$ (catalyst is pretreated with helium at a temperature of about 593° C.), butylenes are dehydrogenated to butadiene at about 370° C. A conversion of about 32%, based on butylene feed, is obtained with a selectivity to butadiene of 100%.

Repeating this experiment at about 405° C., results in 58% conversion with 96% selectivity to butadiene. At 413° C. a 55% conversion with 86% selectivity to butadiene is obtained.

These results are contrasted with a conventional reactor wherein evolved hydrogen is not continuously separated from the reaction mixture and the conversion of feed material is only from 20–30% at temperatures as high as 620° C. Furthermore, at temperatures used in conventional reactors, undesirable side reactions which produce substantial quantities of lighter hydrocarbons also occur, thus increasing the difficulty in separating and recovering the butadiene product. Chromatographic analysis of the products from Example 8 indicated that no side reactions occurred, the product consisting essentially of $C_4$ hydrocarbons.

EXAMPLE 9

In equipment as used in Example 1 and employing the same experimental procedure, except that the catalyst consists of hydrogen treated 3.7 wt. percent $Cr_2O_3$ and 96.3 wt. percent $Al_2O_3$, butane is dehydrogenated to butene at about 460° C. A conversion of about 60%, based on butane feed, is obtained with a selectivity to butene of 66%.

Repeating this experiment at about 477° C. results in a 52% conversion with a selectivity to butene of 75%.

These results are contrasted with a conventional reactor wherein the evolved hydrogen is not continuously separated from the reaction mixture, and conversions of only 20–30% are obtained at 620° C., at which temperature significant hydrocracking of butane occurs.

What is claimed is:

1. A method for the continuous chromatographic catalytic conversion of a fluent feed material which comprises introducing said fluent feed material to a conversion zone, continuously adding a moving bed of finely divided solid particles capable of selectively adsorbing one of the reaction products at a first end of said conversion zone, continuously adding a fluent carrier stream at a second end of said conversion zone, maintaining said conversion zone under conversion conditions of temperature and pressure, continuously withdrawing said bed of finely divided solid particles containing said selectively adsorbed reaction product at said second end of said conversion zone, continuously withdrawing said fluent carrier, unadsorbed reaction products and unreacted feed material at said first end of said conversion zone recovering said adsorbed reaction product from said bed of finely divided solid particles and separately recovering other reaction products from said fluent carrier.

2. The method according to claim 1 wherein said catalytic conversion takes place in the vapor phase and said fluent carrier is gaseous.

3. The method according to claim 1 wherein said catalytic conversion takes place in the liquid phase and said fluent carrier is liquid.

4. The method according to claim 1 wherein said fluent carrier is inert to said catalytic conversion.

5. The method according to claim 1 wherein said fluent carrier is reactive with said fluent feed.

6. The method according to claim 1 wherein said bed of finely divided particles consist essentially of a conversion catalyst and an adsorbent.

7. A method for the continuous chromatographic catalytic dehydrogenation of a hydrocarbon which comprises introducing said hydrocarbon to a conversion zone, continuously adding a bed of finely divided catalyst at a first end of said conversion zone, said bed of catalyst being capable of selectively adsorbing one of the products of said dehydrogenation, continuously adding an inert gaseous carrier at a second end of said conversion zone, maintaining said conversion zone under conversion conditions of temperature and pressure, continuously withdrawing said bed of catalyst containing said selectively adsorbed dehydrogenation product at said second end of said conversion zone, continuously withdrawing said inert gaseous carrier, unadsorbed dehydrogenation product and unreacted hydrocarbon at said first end of said conversion zone, recovering said adsorbed dehydrogenation product from said bed of catalyst and separately recovering said unadsorbed dehydrogenation product from said inert gaseous carrier.

8. The method according to claim 7 wherein said hydrocarbon feed material is cyclohexane, said bed of catalyst is an alumina supported platinum catalyst, and said dehydrogenation is conducted at temperatures ranging from about 190° C. to about 200° C.

9. The method according to claim 7 wherein said hydrocarbon feed material comprises a butylene, said bed of catalyst is an iron oxide catalyst promoted with potassium and chromic oxides, and said dehydrogenation is conducted at temperatures ranging from about 460° C. to about 480° C.

10. The method according to claim 7 wherein said hydrocarbon feed material is a paraffin, said bed of catalyst is an alumina supported chromic oxide catalyst, and said dehydrogenation is conducted at temperatures ranging from about 370° C. to about 420° C.

11. The method according to claim 10 wherein said paraffin is butane.

References Cited
UNITED STATES PATENTS

| | | | |
|---|---|---|---|
| 2,944,090 | 7/1960 | Guthrie | 260—668 |
| 2,976,132 | 3/1961 | Dinwiddie et al. | 260—680 |
| 3,064,062 | 11/1962 | Lorz et al. | 260—683.3 |
| 3,159,455 | 12/1964 | Skaperdas et al. | 23—1 |
| 3,243,472 | 3/1966 | Dinwiddie | 260—680 |

DELBERT E. GANTZ, *Primary Examiner.*

G. E. SCHMITKONS, *Assistant Examiner.*